United States Patent
Yasrebi et al.

(10) Patent No.: US 8,099,390 B2
(45) Date of Patent: Jan. 17, 2012

(54) METHOD AND SYSTEM FOR MANAGING CHANGES IN ORGANIZATIONAL DATA IN UNIFIED MESSAGING SYSTEMS

(75) Inventors: Mehrad Yasrebi, Austin, TX (US); James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 497 days.

(21) Appl. No.: 12/335,021

(22) Filed: Dec. 15, 2008

(65) Prior Publication Data
US 2010/0153340 A1    Jun. 17, 2010

(51) Int. Cl.
*G06F 17/30* (2006.01)
(52) U.S. Cl. ........................ 707/639; 707/649
(58) Field of Classification Search ............ 707/739
See application file for complete search history.

(56) References Cited

U.S. PATENT DOCUMENTS

| | | | |
|---|---|---|---|
| 4,837,798 A | 6/1989 | Cohen et al. | |
| 6,567,774 B1 * | 5/2003 | Lee et al. | 703/23 |
| 6,721,398 B1 | 4/2004 | Pitcher | |
| 7,085,785 B2 * | 8/2006 | Sawdon et al. | 1/1 |
| 7,224,775 B1 * | 5/2007 | Shaffer et al. | 379/88.16 |
| 7,260,607 B2 | 8/2007 | Aktas et al. | |
| 7,272,214 B2 * | 9/2007 | Didcock et al. | 379/88.25 |
| 7,349,528 B2 | 3/2008 | Schmidt, Jr. et al. | |
| 7,433,925 B1 | 10/2008 | Shankar et al. | |
| 7,685,169 B2 * | 3/2010 | Hitz et al. | 707/999.201 |
| 7,693,267 B2 * | 4/2010 | Howell et al. | 379/88.14 |
| 2002/0178146 A1 * | 11/2002 | Akella et al. | 707/2 |
| 2003/0088441 A1 * | 5/2003 | McNerney | 705/3 |
| 2004/0122835 A1 * | 6/2004 | McKibben et al. | 707/100 |
| 2006/0013368 A1 | 1/2006 | LaBaw | |

FOREIGN PATENT DOCUMENTS

EP    1 906 623 A1 *    4/2008

* cited by examiner

*Primary Examiner* — Wilson Lee
*Assistant Examiner* — Binh V Ho

(57) ABSTRACT

A method and system for automatically managing changes to organizational data in a unified messaging (UM) platform are disclosed. A database snapshot is retrieved from a client human resources database. The database snapshot includes human resources information organized in an organizational hierarchy. A change is detected in the database snapshot from a previous database snapshot, and organizational data in the UM platform is automatically modified to reflect the detected change in the database snapshot. When the change is detected in the database snapshot, it is possible for the UM platform to automatically compose and send a message to at least one user associated with the change including potential modifications of the organization data. The organizational data in the UM platform can then be modified only in response to receiving approval of the potential modifications of the organizational data from at least one user associated with the change.

23 Claims, 5 Drawing Sheets

METHOD AND SYSTEM FOR MANAGING CHANGES IN ORGANIZATIONAL DATA IN UNIFIED MESSAGING SYSTEMS

BACKGROUND OF THE INVENTION

The present invention relates generally to provisioning organizational definitions and more particularly to provisioning organizational definitions in a unified messaging platform environment.

Unified messaging is the integration of multiple (typically two or more) types of communication (e.g., email, voicemail, short message service (SMS), fax, etc.) into a single, unified message store (e.g., a unified messaging platform) accessible from a variety of user devices. Unified messaging is typically provided by a service provider, which may be the same service provider that provides telephone service. In order for a service provider to provide unified messaging service to an organization of subscribers (also called users, which may be employees of a client organization), the unified messaging platform must be configured with organizational data regarding related groups in the client organization's organizational structure. Each client can be assigned his/her own unified messaging mailbox.

Conventionally, provisioning of business groups of a subscriber into the unified messaging platform is done manually using interactive software. Such software allows a client or the service provider to manually define organizational structures for the client organization in order to define mailboxes for individual users and to maintain group hierarchies in the client's organizational structure. Although this approach is effective, it requires the manual definitions of a client's organizations and groups into organizational data supported by the unified messaging platform. This can be tedious and error-prone. Moreover, manually defining such organizational data can take a long time and be operationally expensive, particularly for larger businesses and organizations. Accordingly, automatic definition of organizational data in a unified messaging platform is desirable.

Furthermore, changes to organizational data due to dynamic personnel data of a client are also managed manually. Such manual management of changes to the organizational data is tedious, error-prone, and operationally expensive. Accordingly, automatic change management of organizational data is a unified messaging platform is desirable.

BRIEF SUMMARY OF THE INVENTION

The present invention provides a method and system for automatically managing changes to organizational data in a unified messaging (UM) platform environment.

In one embodiment of the present invention, a database snapshot is retrieved from a client human resources database. The database snapshot includes human resources information organized in an organizational hierarchy. A change is detected in the database snapshot from a previous database snapshot, and organizational data in the UM platform is automatically modified to reflect the detected change in the database snapshot. When the change is detected in the database snapshot, it is possible for the UM platform to automatically compose and send a message to at least one user associated with the change including potential modifications of the organization data. The organizational data in the UM platform can then be modified only in response to receiving approval of the potential modifications of the organizational data from at least one user associated with the change.

These and other advantages of the invention will be apparent to those of ordinary skill in the art by reference to the following detailed description and the accompanying drawings.

DETAILED DESCRIPTION

Embodiments of the present invention are directed to an enhanced unified messaging (UM) system, in which organization data corresponding to an organizational hierarchy of a client is automatically provisioned.

Figure 1:
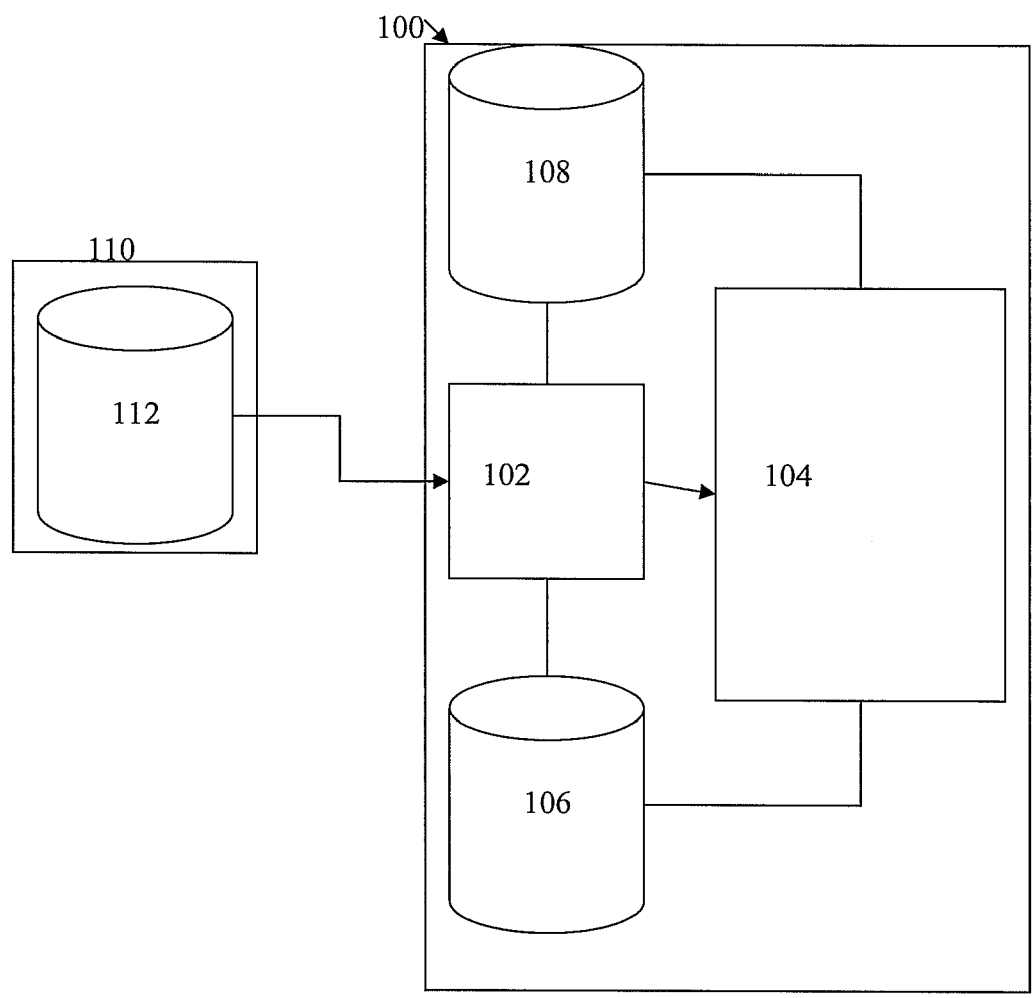
FIG. 1 illustrates a unified messaging system according to an embodiment of the present invention.

FIG. 1 illustrates a unified messaging system 100 according to an embodiment of the present invention. Unified messaging (UM) system 100 includes a UM platform 104 and a controller 102 that automatically defines organizational data corresponding to an organizational structure of a customer (client) 110 in the UM platform 104. The controller 102 interfaces with the client's 110 organizational databases, such as human resources database 112. The human resources database 112 stores entries corresponding to users (e.g., employees) associated with the client 110. The entries of the human resources database 112 are logically organized hierarchically according to a hierarchical organizational structure of the client 110, and include human resources information associated with the users, such as name, telephone number (TN), geographical location, group membership, device specifications, alternate devices that may be used in find me follow me (FMFM) scenarios, etc. Human resources databases are often linked with, or used as or in conjunction with telephone databases. Accordingly, the term "human resources database" is used herein to cover all such cases.

The controller 102 retrieves the organizational hierarchy from the human resources database 112, and creates corresponding organizational data in the UM platform 104. For example, the controller 102 can create Intermediate Logic Nodes (ILNs) and Communities of Interest (COIs) corresponding to the organizational hierarchy of the human resources information stored in the human resources database 112. In the UM platform 104, a COI is group that shares one or more common attributes. For example, a group of employees located at a particular geographical branch of a business, or a group of employees who report to the same supervisor can be grouped into a COI. An ILN is an organizational designation for which there are one or more COIs. For example, an ILN of location can have multiple COIs, each COI corresponding to a particular geographical branch of a business. As another example, an ILN may be used to represent a branch location, and the COIs that are under that ILN may represent various departments in that location. It is to be understood, that the organizational structure of a particular organization or business can be organized according to various ILNs and COIs. An advantage of the UM system 100 of FIG. 1 is that the controller 102 automatically reflects the organizational structure of information stored in the human resources database 122 in the ILNs and COIs created for the UM platform 104.

The controller 102 can be implemented as a processor executing software instructions for defining the organizational data. The controller 102 can communicate with the UM platform 104 using a UM application programming interface (API). According to an advantageous embodiment, the controller 102 can communicate with the UM platform 104 using a previously existing API used for defining organizational data. Accordingly, the controller 102 can be seamlessly integrated into UM platforms already in use. The controller 102 can communicate with the human resources database 112 using an API (e.g., abstracted, LDAP or SQL-based) associated with the human resources database 112. According to a possible implementation, the controller 102 can be pre-designed to interface with the most common types of human resources databases, such as SAP, PeopleSoft, Intuit Payroll solutions, etc. According to another possible implementation, the controller 102 may be custom-designed for any other types of human resources database used by a particular client.

The UM platform 104 includes multiple UM mailboxes located at one or more messaging centers (MCs). The UM interface 104 includes one or more server or server-like devices that can be implemented as computers, such as the computer 200 discussed below with respect to FIG. 4. The MCs can be provided at various geographic locations. Each user of the UM platform 104 is assigned a mailbox. Mailboxes assigned to users grouped within a COI are assigned to the same MC. The UM platform 104 may be coupled to or include the controller 102 and/or a UM database 106. The UM platform 104 stores the organizational data, such as the ILNs and the COIs, created by the UM controller 102 into the UM database 106. The UM database 106 and service provider database 108 may be combined and be part of one database, and may also be integrated with the UM platform 104.

When the controller 102 derives the organizational data for the UM platform 104 corresponding to the human resources information in the human resources database 112, the UM platform 104 may automatically provision a mailbox for each user specified in the human resources information. The controller 102 assigns mailboxes associated with the users to MCs based on the COIs associated with the users, so that the UM mailboxes for all users associated with a COI are assigned to the same MC. In addition to the human resources information retrieved from the human resources database 112, the UM platform 104 can be provided with additional data from a service provider database 108 to influence the assignment of the COIs to various MCs. The service provider database 108 can be coupled to or included in the UM platform 104, or can be maintained by a service provider separately from the UM platform 104. The service provider database 108 can include information such as geographical locations of users, local access and transport area (LATA) definitions, call forwarding number (CFN) definitions, capacity constraints of existing UM MCs, etc. The UM platform 104 can utilize this information when assigning mailboxes of users associated with a COI to an MC.

Placements of logical organizational units (e.g., COIs) at MCs can be adjusted at any time. Illustratively, the following parameters can be provided by the UM platform 104 for automatic provisioning: (1) (NPA, NNX) tuple and the target MC name for mapping COIs to specific MCs. The mapping of the target MCs may be automatically conditioned on the capacity of available MCs, whereby a list of MCs is provided to overcome remaining capacity limitations; (2) CFN to MC mappings; and (3) Class of Service (COS) identification. It is to be understood that these parameters are exemplary, and other parameters may be provided as well.

The system of FIG. 1 can be implemented as a "turn key" operation with existing UM platforms to achieve virtually instantaneous group definitions and virtually no errors. Furthermore, the service provider can access the adaptor 102 and/or UM platform 104 in order to fine tune changes or modify group definitions. Programming and/or user interface access may also be given to the customer so that the customer can also modify or customize the group definitions.

Figure 2:
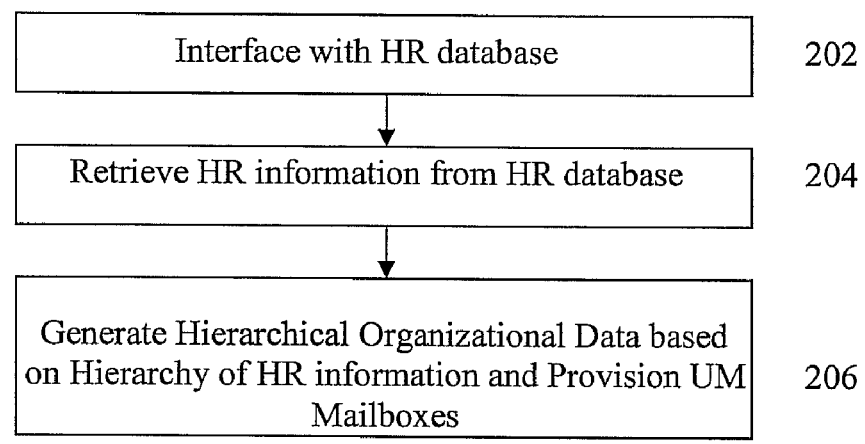
FIG. 2 illustrates a method for defining organizational data in a UM platform according to an embodiment of the present invention.

FIG. 2 illustrates a method 200 for defining organizational data in a UM platform according to an embodiment of the present invention. The method 200 of FIG. 2 automatically transforms human resources data representing entities (users) and an organizational structure of a business or organization into logical organizational units associated with the UM platform. As illustrated in FIG. 2, at step 202, a UM platform interfaces with a client's human resource (HR) database. For example, an adaptor of the UM platform can connect to or communicate with the HR database. When the adaptor is in communication with the HR database, these components can transmit signals and/or information to each other using any appropriate interfaces (e.g., SQL, LDAP, etc.) over any appropriate communication protocols. At step 204, the controller of the UM platform retrieves HR information organized in an organizational hierarchy from the HR database. At step 206, hierarchical organizational data is automatically generated in the UM platform based on the organizational hierarchy of the human resources information, and UM mailboxes are provisioned based on the hierarchical organizational data. For example, ILNs and COIs are automatically generated based on the organization structure of the human resources information. Mailboxes for users grouped in COIs are created and assigned to various MCs associated with the COIs.

Figure 3:
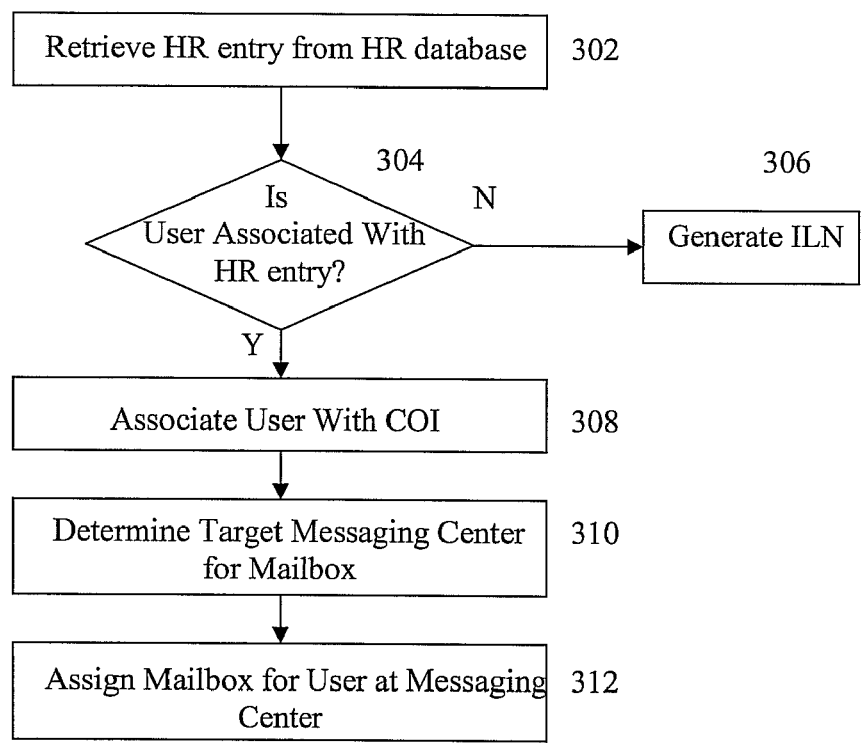
FIG. 3 illustrates a method for generating and provisioning hierarchical organizational data in a UM platform according to an embodiment of the present invention.

FIG. 3 illustrates a method 300 for generating and provisioning hierarchical organizational data in a UM platform according to an embodiment of the present invention. The method 300 of FIG. 3 can be used to implement steps 204 and 206 of the method of FIG. 2. The method 300 of FIG. 3 processes the HR information from the HR database entry by entry to generate organizational data corresponding to each entry in the UM platform. As illustrated in FIG. 3, at step 302, an HR entry is retrieved from the HR database. At step 304, it is determined whether a user (i.e., person) is associated with the HR entry. If there is no user associated with the HR entry, the method proceeds to step 306. If there is a user associated with the HR entry, the method proceeds to step 308.

At step 306, if there is no user associated with the HR entry, an ILN corresponding to the entry is generated. If there is no user associated with the entry, the entry represents an organizational entity, not an individual. An ILN representing the entity is generated and the name is used as the name of the ILN in the UM platform. The ILN may be created in all of the MCs of the UM platform without any associated mailboxes (as metadata, since mailboxes are associated with COs). After the ILN is generated, the method proceeds to the next HR entry.

At step 308, if there is a user associated with the HR entry, the user (the HR entry) may be associated with a COI node. In particular, if a COI node does not yet exist for this organizational level, the COI node is created. Other users at the same organizational level may then be assigned to this COI node. If the appropriate COI node already exists, the user may be associated with the existing COI node.

At step 310, a target MC is determined for a user mailbox. At step 312, a mailbox may be created for the user at the determined MC. A configured UM input parameter can be used to assign the mailbox to a given MC. For example, the UM platform may provide the following data to controller: (NPA, NNX)→MC name, LATA. Accordingly, based on the NPA and NNX of the TN associated with the user, the controller assigns the user to a particular MC and LATA. If a capacity constraint of a configured MC is above a certain threshold, a list of other MCs in the LATA can be provided by the UM platform, and another configured MC can be used. This fact and the result of the operation are communicated to the UM platform. The MC name of the MC to which the mailbox is assigned can be used to drive the Call Forwarding Number (CFN) information for that MC. Accordingly, a CFN associated with the mailbox can be determined based on the assigned MC. The mailbox can be created for the user with the primary contact number of the user as the key to the mailbox creation (i.e., resulting in a Web Services API call createMailbox (TN, CFA, LATA, COS, ... )). The user's name is mapped to the subscriber of that mailbox. Alternate device information may be, optionally, incorporated into the mailbox definition (e.g., for UM FMFM service).

As described above, the method of FIG. 3 generates and provisions organizational data in the UM platform corresponding to an HR entry. The method is repeated for all HR entries in the HR database. Accordingly, the graph (e.g., tree) of HR entries are automatically mapped into ILN and COI nodes in the UM platform by the controller using predefined mappings provided by the UM platform. These template production rules can be customized for each organization. Schemas of HR databases are generally unique to each vendor, and maybe different for each business. Hence, column names, for example, may be unique for each business customer, while particular column names may or may not be the same as other customers of the same database vendor.

Although enterprise mailboxes in the UM platform can be initially provisioned in bulk mode, as described above, conventional procedures do not allow for automated, auditable and confirmed flow-through changes to the UM mailboxes of the assigned users. Embodiments of the present invention provide automatic, flow-through management of changes to the organization data of the UM platform. In particular, embodiments of the present invention manage change in the organizational data of the UM platform in response to changes in the human resources data in a human resources database. For example, examples of such changes can include additions, suspensions, deletions, and device changes for users (e.g., employees) of an enterprise (client).

Automatic change management can be implemented using the enhanced UM system 100 of FIG. 1. Returning to FIG. 1, the controller 102 (also called adapter 102), which can be coupled to and/or part of the UM platform 104, can function as an organizational change management module that manages changes to the operational data of the UM platform 104 that is stored in the UM database 106. The controller 102 retrieves human resources information from the human resources database 112 and detects changes from previous human resources information. The controller 102 can modify the organizational data of the UM platform 104 in order to reflect the detected changes.

Figure 4:
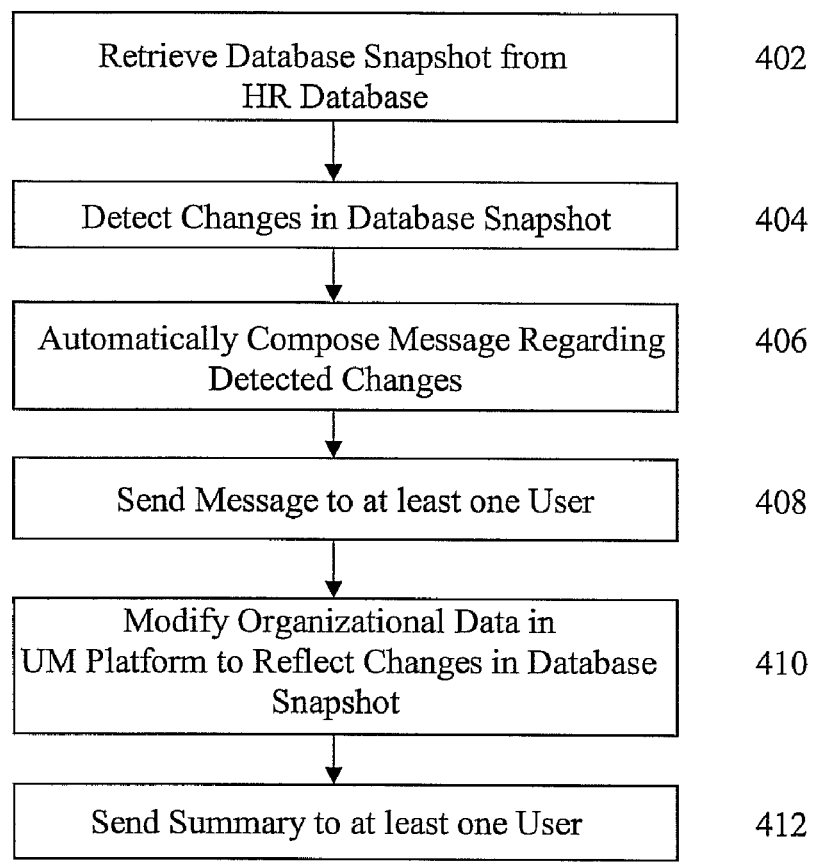
FIG. 4 illustrates a method for managing changes to organizational data in a UM platform according to an embodiment of the present invention and FIG. 5 is a high level block diagram of a computer capable of implementing the present invention.

FIG. 4 illustrates a method 400 for managing changes to organizational data in a UM platform according to en embodiment of the present invention. The method 400 of FIG. 4 transforms human resources data in the human resources database representing various users and/or devices into organizational data in the UM platform.

Referring to FIG. 4, at step 402 a database snapshot is retrieved from the human resources (HR) database. As used herein, the term "database snapshot" refers to all or a portion of the information stored in a database at a given time. According to a possible implementation, the database snapshot of the HR database may be retrieved at a regular time interval, such as nightly. According to another possible implementation, the database snapshot may be retrieved "on demand" in response to an instruction from a user to retrieve the snapshot data. According to yet another possible implementation, the database snapshot may be retrieved in response to a trigger in the HR database. In this situation, predefined types of changes in the HR database trigger predefined types of changes in the UM organizational data. When a change is made in the HR database, an alert is sent to the UM platform. The HR database snapshot is retrieved from the HR database in response receiving the alert.

At step 404, changes in the HR database snapshot from a previous HR database snapshot are detected. The changes in the HR database snapshot are detected by comparing the database snapshot to the previous database snapshot. The comparison may be performed on a whole database (e.g., in the case of periodic or on demand executions) or only on the changed records (e.g., in the case of the UM platform receiving trigger notifications from the HR database regarding specific change records). In an alternate implementation, changes can be detected by generating UM organizational data corresponding to the HR database snapshot and comparing this data to previously generated UM organizational data corresponding to the previous HR database snapshot.

At step 406, a message may be automatically composed regarding each detected change. The message is dynamically generated and includes information regarding the detected changes, the affected individual (user), the status associated with the affected user, (e.g., deleted, suspended, newly created), and proposed or potential changes to the organizational data in the UM platform corresponding to the detected changes.

At step 408, the message is sent to at least one user associated with the detected change. For example, the message can be sent to any or all of the affected user, a supervisor of the affected user, and an assigned customer contact (e.g., Human Resources representative). The message can provide a user with the options of accept, reject, or ignore. According to a possible implementation, the message can be sent using out-dial Interactive Voice Response (IVR). According to another possible implementation, the message can be sent as an email with randomized hyperlinks for each action (accept, reject, and ignore). A user receiving the message can accept, reject, or ignore the proposed changes to the UM organizational data. If the user selects "ignore", it is possible for that the potential modifications to the UM organizational data be kept in a pending state. It is also possible that "ignore" is treated as a default acceptance or rejection according to a client preference. It is also possible that the UM platform 104 treats a lack of receipt of a response to such an inquiry as ignore, accept or reject, as the UM platform 104 may be configured. It is also possible to combine such change-notification messages regarding more than one subscriber into each such client message (e-mail, IVR, etc.). Each client response may be in the form of a Uniform Resource Locator (URL) link activation, a web-based interface, and IVR response, or any other appropriate method.

At step 410, the organizational data of the UM platform may be automatically modified to reflect the detected changes in the database snapshot, in response to receiving approval from at least one authorized user associated with the detected change, or by defaulting to such an acceptance state. The organizational data of the UM platform can be modified using UM application programming interfaces (API) that reflect changes to the records of the HR database. High-level examples of customer enterprise (HR) database changes and associated UM APIs are shown in Table 1 below:

TABLE 1

| DB Changes | Triggered UM API Functions |
|---|---|
| Employee added | createMailbox(TN, . . . ) |
| Employee device changed | a) deletedDevice(mailboxID, TN, . . . ), if previous device is no longer there, and<br>b) addDevice( ), if new device is added |
| Employee deleted | deleteMailbox(mailboxID, . . . ) |
| Employee status changed to "suspended" | disableMailbox (mailboxID, . . . ) |

As shown in Table 1, when an employee (user) is added to the HR database, the organizational data in the UM platform is modified by creating mailbox. The employee's telephone number (TN) for his/her phone device can be used in the identification of the corresponding mailbox. When a device is no longer in the HR database, the device is deleted from the organizational data in the UM platform. When a new device is added to the HR database, the device is added to the organizational data of the UM platform. When an employee is deleted from the HR database, the corresponding mailbox is deleted from the organizational data in the HR platform. When an employee is suspended, the employee's mailbox is disabled in organizational data of the HR platform. It is to be understood that the UM API functions show in Table 1 are exemplary, and other existing and/or new API functions can also be used to modify the organizational data of the UM platform.

At step 412, a summary of the modifications to the organizational data in the UM platform may be is sent to at least one authorized user associated with the changes. For example, the summary can be sent to one or more authorized client contacts. The summary can be sent via out-dial IVR or as an email or any other appropriate mechanism. The UM platform 104 may also send a message to the affected user about the specific change(s) to his/her mailbox, depending on the nature of the change and configuration of the UM system.

As described above in steps 406-410, in an embodiment of the present invention, a message regarding the detected changes is automatically composed and sent, and the UM organizational data is modified to reflect the detected changes in response to receiving an approval or after expiration of a time period without receiving an approval. According to another embodiment of the present invention, it is possible to automatically modify the organizational data in the UM platform to reflect the detected changes without attempting to obtain approval. In this case, the UM organizational data can be modified without first composing and sending a message regarding the detected changes. The summary of the changes can then be sent to at least one user associated with the changes in order to alert the one or more authorized individuals (possibly, including the user) of the modifications made to the UM organizational data.

The embodiments of the present invention described above provide methods for managing changes to organizational data in the UM platform that eliminate significant recurring costs, provide an audit trail of activities, implement a configurable approval mechanism by zero or more configurable parties, and provide a virtually error free flow-through scheme.

Figure 5:
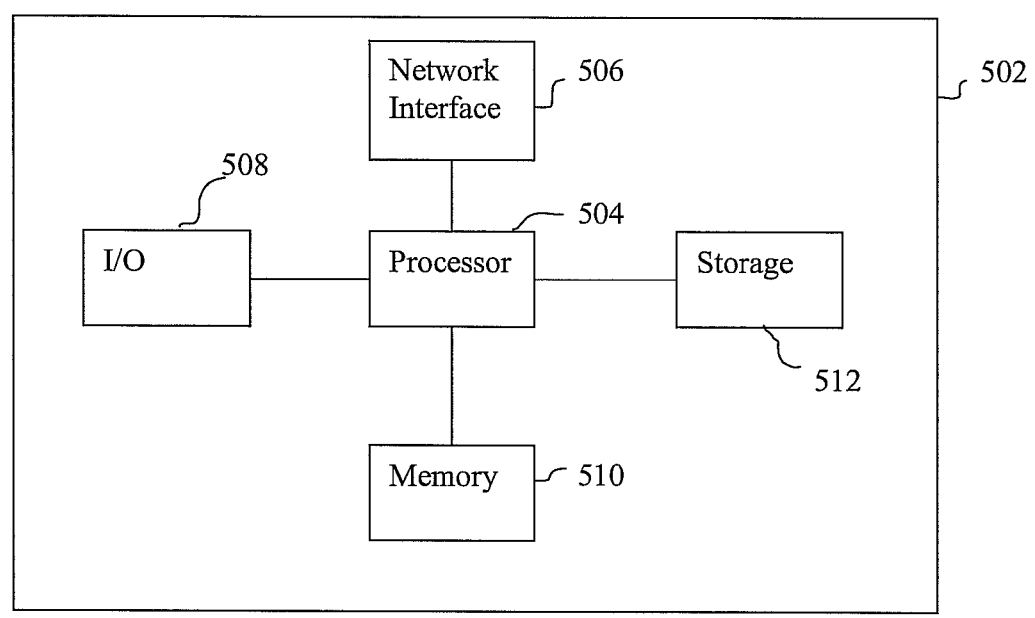

The above described methods for defining and provisioning organizational data in a UM platform and for managing changes to organizational data in a UM platform can be implemented on a computer using well-known computer processors, memory units, storage devices, computer software, and other components. A high-level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium (e.g., magnetic disk, CD ROM, etc.), and loaded into memory 510 when execution of the computer program instructions is desired. Thus, the method steps of FIGS. 2, 3, and 4 can be defined by the computer program instructions stored in the memory 510 and/or storage 512 and controlled by the processor 504 executing the computer program instructions. For example, the computer program instructions can be implemented as computer executable code programmed by one skilled in the art to perform an algorithm defined by the method steps of FIGS. 2, 3, and 4. Accordingly, by executing the computer program instructions, the processor 504 executes an algorithm defined by the method steps of FIGS. 2, 3, and 4. The computer 502 also includes one or more network interfaces 506 for communicating with other devices via a network. The computer 502 also includes input/output devices 508 that enable user interaction with the computer 502 (e.g., display, keyboard, mouse, speakers, buttons, etc.) One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. The various functional modules that are shown are for illustrative purposes only, and may be combined, rearranged and/or otherwise modified.

What is claimed is:

1. A method for automatically managing changes to organizational data in a Unified Messaging (UM) platform, comprising:
    retrieving a database snapshot from a client human resources database, the database snapshot including human resources information organized in an organizational hierarchy;
    detecting a change in the database snapshot from a previous database snapshot; and
    automatically modifying organizational data in the UM platform to reflect the detected change in the database snapshot, wherein the step of automatically modifying organizational data in the UM platform to reflect the detected change in the database snapshot comprises:
        automatically composing a message regarding the detected change and potential modifications of the organizational data in the UM platform;

sending the message to at least one user associated with the detected change; and modifying the organizational data in the UM platform in response to receiving approval of the potential modifications of the organizational data by the at least one user.

2. The method of claim 1, wherein the step of retrieving a database snapshot comprises:

retrieving a database snapshot from the client human resources database at a regular time interval.

3. The method of claim 1, wherein the step of retrieving a database snapshot comprises:

receiving an alert from the client human resources database in response to one or more database triggers; and retrieving the database snapshot from the client human resources database in response to the alert.

4. The method of claim 1, wherein the step of detecting a change in the database snapshot from a previous database snapshot comprises:

generating organizational data in the UM platform corresponding to the database snapshot; and comparing the organizational data corresponding to the database snapshot with organizational data in the UM platform corresponding to the previous snapshot.

5. The method of claim 1, the step of detecting a change in the database snapshot from a previous database snapshot comprises:

receiving an alert from the client human resources database in response to one or more database triggers, the alert identifying changes corresponding to the one or more database triggers.

6. The method of claim 1, further comprising:

canceling the modifications to the organizational data in the UM platform in response to receiving a rejection of the potential modifications of the organizational data by the at least one user.

7. The method of claim 1, wherein the at least one user comprises at least one of a user affected by the detected changes, a supervisor of the user affected by the detected changes, and an assigned customer contact.

8. The method of claim 1, wherein the step of sending the message to at least one user associated with the detected change comprises:

sending the message via one of out-dial Interactive Voice Response (IVR) and an email with randomized hyperlinks.

9. The method of claim 1, further comprising:

automatically sending a summary of the modified organizational data in the UM platform to at least one user associated with the detected changes.

10. The method of claim 1, wherein the step of automatically modifying organizational data in the UM platform to reflect the detected change in the database snapshot comprises:

modifying the organizational data in the UM platform using at least one UM application programming interface (API) functions.

11. A system for automatically managing changes to organizational data in a Unified Messaging (UM) platform, comprising:

means for retrieving a database snapshot from a client human resources database, the database snapshot including human resources information organized in an organizational hierarchy;

means for detecting a change in the database snapshot from a previous database snapshot; and means for automatically modifying organizational data in the UM platform to reflect the detected change in the database snapshot, wherein the means for automatically modifying organizational data in the UM platform to reflect the detected change in the database snapshot comprises:

means for automatically composing a message regarding the detected change and potential modifications of the organizational data in the UM platform;

means for sending the message to at least one user associated with the detected change; and means for modifying the organizational data in the UM platform in response to receiving approval of the potential modifications of the organizational data by the at least one user.

12. The system of claim 11, wherein the means for retrieving a database snapshot comprises:

means for retrieving a database snapshot from the client human resources database at a regular time interval.

13. The system of claim 11, wherein the means for retrieving a database snapshot comprises:

means for receiving an alert from the client human resources database in response to one or more database triggers; and means for retrieving the database snapshot from the client human resources database in response to the alert.

14. The system of claim 11, further comprising:

means for canceling the modifications to the organizational data in the UM platform in response to receiving a rejection of the potential modifications of the organizational data by the at least one user.

15. The system of claim 11, further comprising:

means for automatically sending a summary of the modified organizational data in the UM platform to at least one user associated with the detected changes.

16. The system of claim 11, wherein the means for automatically modifying organizational data in the UM platform to reflect the detected change in the database snapshot comprises:

means for modifying the organizational data in the UM platform using at least one UM application programming interface (API) functions.

17. A computer readable medium encoded with computer executable instructions for automatically managing changes to organizational data in a Unified Messaging (UM) platform, the computer executable instructions defining steps comprising:

retrieving a database snapshot from a client human resources database, the database snapshot including human resources information organized in an organizational hierarchy;

detecting a change in the database snapshot from a previous database snapshot; and automatically modifying organizational data in the UM platform to reflect the detected change in the database snapshot, wherein the computer executable instructions defining the step of automatically modifying organizational data in the UM platform to reflect the detected change in the database snapshot comprise computer executable instructions defining the steps of:

automatically composing a message regarding the detected change and potential modifications of the organizational data in the UM platform;

sending the message to at least one user associated with the detected change; and modifying the organizational data in the UM platform in response to receiving approval of the potential modifications of the organizational data by the at least one user.

18. The computer readable medium of claim 17, wherein the computer executable instructions defining the step of retrieving a database snapshot comprise computer executable instructions defining the step of:
retrieving a database snapshot from the client human resources database at a regular time interval.

19. The computer readable medium of claim 17, wherein the computer executable instructions defining the step of retrieving a database snapshot comprise computer executable instructions defining the steps of:
receiving an alert from the client human resources database in response to one or more database triggers; and
retrieving the database snapshot from the client human resources database in response to the alert.

20. The computer readable medium of claim 17, further comprising computer executable instructions defining the step of:
canceling the modifications to the organizational data in the UM platform in response to receiving a rejection of the potential modifications of the organizational data by the at least one user.

21. The computer readable medium of claim 17, wherein the computer executable instructions defining the step of sending the message to at least one user associated with the detected change comprise computer executable instructions defining the step of:
sending the message via one of out-dial Interactive Voice Response (IVR) and an email with randomized hyperlinks.

22. The computer readable medium of claim 17, further comprising computer executable instructions defining the step of:
automatically sending a summary of the modified organizational data in the UM platform to at least one user associated with the detected changes.

23. The computer readable medium of claim 17, wherein the computer executable instructions defining the step of automatically modifying organizational data in the UM platform to reflect the detected change in the database snapshot comprise computer executable instructions defining the step of:
modifying the organizational data in the UM platform using at least one UM application programming interface (API) functions.

* * * * *